United States Patent [19]
Ewald

[11] 3,736,852
[45] June 5, 1973

[54] CAMERA BATTERY CHECKER

[75] Inventor: William Philip Ewald, Webster, N.Y.

[73] Assignee: Eastman Kodak Company, Rochester, N.Y.

[22] Filed: Feb. 28, 1972

[21] Appl. No.: 229,936

[52] U.S. Cl..................95/10 C, 95/64 D, 250/215, 352/141
[51] Int. Cl............................G03b 17/18, G01j 1/42
[58] Field of Search...............95/10 C, 10 CE, 64 D; 352/141; 250/215; 324/76, 96

[56] References Cited
UNITED STATES PATENTS

| | | | |
|---|---|---|---|
| 3,517,599 | 6/1970 | Sapp, Jr. et al. | 95/64 D |
| 3,459,113 | 8/1969 | Falkerberg | 95/64 D |
| 3,452,347 | 6/1969 | Stimson | 352/141 |

Primary Examiner—Joseph F. Peters, Jr.
Attorney—W. H. J. Kline and John L. Palmer

[57] ABSTRACT

Battery checking apparatus for use in cameras utilizing a photosensitive element in circuit with a galvanometer, the galvanometer having a deflection related to the intensity of scene light incident onto the photosensitive element. The apparatus provides a tungsten lamp which is connectable in circuit with a battery to be checked, and a shield which is operative for blocking the scene light from impinging onto the photosensitive element. When the tungstem lamp is connected in circuit with the battery and scene light is blocked, the photosensitive element is illuminated only by light from the tungstem lamp, the luminosity of which varies with the battery voltage. The varying luminosity is received by the photosensitive element which results in a deflection of the galvanometer that is related to the voltage available from the battery. The amount of deflection of the galvanometer may be shown by a signal utilized to indicate the voltage level of the battery.

7 Claims, 2 Drawing Figures

PATENTED JUN 5 1973

3,736,852

CAMERA BATTERY CHECKER

BACKGROUND OF THE INVENTION

1. Field of the Invention

This invention relates to a battery checker for cameras and more particular to an arrangement for utilizing camera exposure control and/or light measuring apparatus in conjunction with a tungsten filament lamp for determining the power condition of a camera battery.

2. DESCRIPTION OF THE PRIOR ART

As is well known, most modern types of cameras, both still and movie, utilize one or more batteries for powering the several different operations of the camera such as lens adjustment and/or shutter adjustment, automatic film advance and rewind, and flash bulb energization, or the like. These batteries are often of special design for the respective purposes and are positioned in the cameras so unobtrusively and operate with such effectiveness that they tend to be taken for granted by the user and be forgotten. This performance is, of course, highly desirable from a standpoint of the operator. Unfortunately, the batteries on occasion fail or weaken due to age or use, and when such conditions are not detected by the user, film wastage and picture failures may well result. It is desirable therefore that some means for checking the batteries be provided in the camera. It is particularly important when the battery is powering a small motor for film winding that a predetermined minimum of voltage be maintained.

While battery checking arrangements have previously been provided in certain types of cameras, they have in many instances provided a go, no-go battery condition or require the operators eye to integrate light from an indicator lamp to determine battery condition. It has been suggested that metering such as a galvanometer be connected in circuit with the battery to register the battery voltage condition; however, it is known that a battery may have a requisite voltage reading across its terminals yet cannot supply power to camera equipment, i.e., it immediately fails under load. This is primarily due to the fact that metering does not sufficiently load the battery during the checking operation. Further, the scale of the battery-metering system cannot be expanded to an appropriate size within the camera structure to detect minute voltage changes in the battery, such as for example a change of 0.1 volts in a 3 volt battery.

SUMMARY OF THE INVENTION

Therefore, it is an object of the invention to provide improved battery checking apparatus for photographic cameras which provides an indication of battery power available for use in camera operation.

It is another object of the invention to provide the battery checking apparatus for a camera which utilizes existing camera elements in conjunction with a tungsten filament lamp in circuit with the battery to be checked.

It is still another object of the present invention to provide battery checking apparatus which will provide an indication of battery power below a predetermined minimum level.

In accordance with one illustrative embodiment of the invention, a battery checking arrangement is operatively associated with a photosensitive element exposed to ambient scene light, and a galvanometer operating in accordance with an electrical output of the photosensitive element for providing a deflection of the galvanometer related to the intensity of the ambient scene light. A tungsten filament lamp is connectable in circuit with a battery to be checked, the lamp having a luminosity varying in intensity in accordance with the variations in the battery voltage. Means are provided for blocking scene light from impinging onto the photosensitive element so that the photosensitive element is illuminated solely by the light from the lamp. The photosensitive element provides an output related to the light intensity which causes a deflection of a galvanometer that may be related to the battery power condition. The photosensitive element may be a photovoltaic cell disposed to receive scene light and to cause a galvanometer deflection in accordance with the ambient scene light incident thereon. A light shield is effective to block the ambient light and to couple the battery in circuit with the tungsten lamp so that the light from the lamp impinges upon the photovoltaic cell causing a current flow between the terminals thereof, and a deflection of the galvanometer in accordance with the amount of current flow from the photovoltaic cell. The amount of current between the terminals of the photovoltaic cell is directly related to the amount of power available in the battery.

BRIEF DESCRIPTION OF THE DRAWINGS

The invention and its objects and advantages, will become more apparent in the detailed description of the preferred embodiment presented below in conjunction with the accompanying drawings in which.

DESCRIPTION OF THE PREFERRED EMBODIMENTS

Because photographic cameras are well known, the present description will be directed in particular to elements forming part of or cooperating more directly with the present invention, camera elements not specifically shown or described herein being understood to be selectable from those known in the art.

Figure 1:
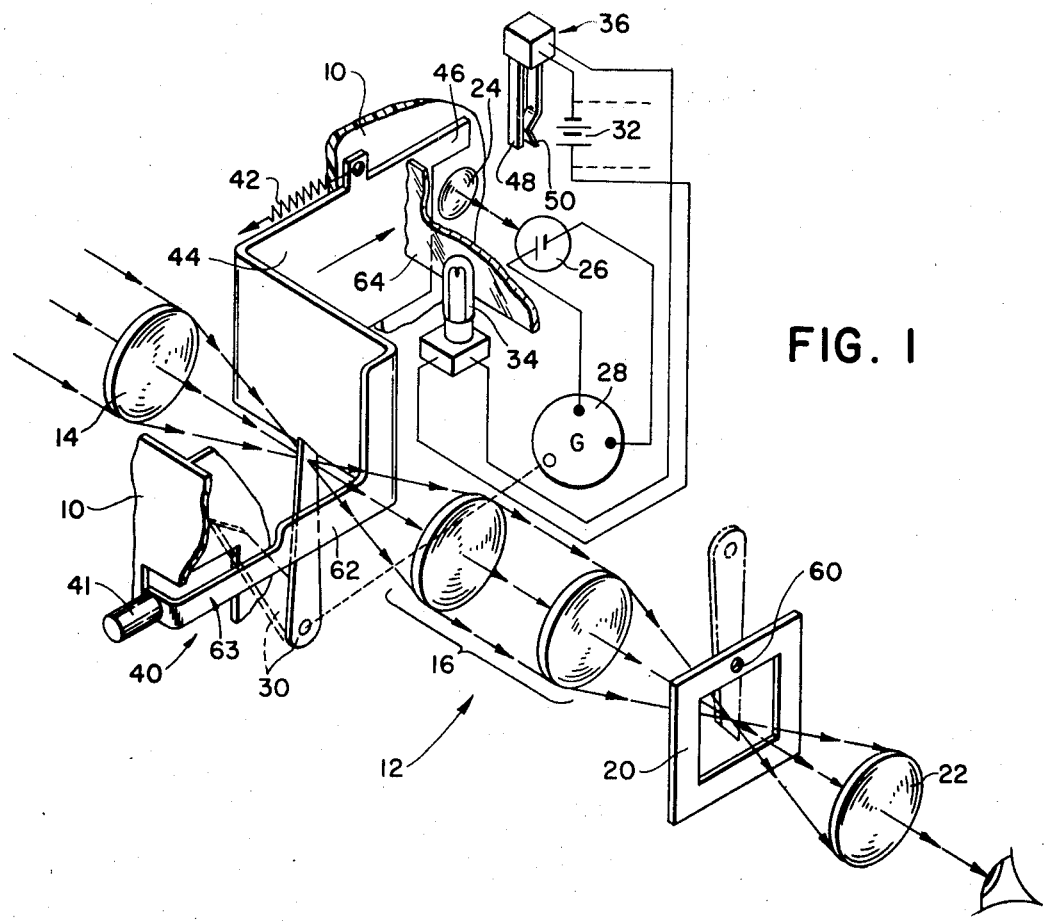
FIG. 1 is a schematic diagram in partial perspective of a camera including battery checking arrangement according to one embodiment of the invention.

Referring now to FIG. 1, a portion of a camera casing 10 is shown in section. For purposes of clarity only those portions on the overall assembly directly involved in the operation of the battery checking arrangement of the present invention, and therefore pertinent to the proper disclosure of the invention, are shown and will be described. A view finder assembly 12 which may include an objective lens 14, erecting lens component 16 a field mask 20 and an eyepiece 22, operates in the usual manner to provide an erect image of an object scene received by the objective lens 14. A lens 24, also in the camera casing 10, admits object scene light into the camera where the light impinges upon a photovoltaic cell 26. The photovoltaic cell 26 may be any one of the known devices having the property that no external power source is required for its operation and that upon impingement of light onto the photovoltaic cell 26 a current will be generated between its terminals of a magnitude related to the intensity of the impinging light. The photovoltaic cell 26 may also be replaced by a photocell, such as a cadmium sulfide cell, and a battery which operates in a known manner for providing a current flow that is dependent upon the resistance of the photocell, the resistance of the photocell being related to the intensity of the impinging light. The photovoltaic cell 26 is coupled in series circuit with a galvanometer 28 for use as a camera diaphragm adjusting mechanism and/or an indication of existing light conditions.

In the illustrated embodiment only portions of the camera which use the photovoltaic cell 26 and galvanometer 28 as a conventional light measuring device for indicating the availability of scene light are shown. A signal vane 30 is operatively coupled by conventional means to the galvanometer 28 in a manner such that ambient scene light impinging upon the photovoltaic cell 26 will cause a deflection of the galvanometer 28, resulting in a movement of the signal vane 30 relative to the view finder assembly 12, providing an operator viewing a scene through the view finder assembly 12 with means for establishing a light level check before starting an exposure.

Pursuant to the present invention, provision is made whereby the signal vane 30, the photovoltaic cell 26 and galvanometer 28 may be used to check the condition of a camera battery 32. The battery 32 to be checked is connected in a normally open circuit with a lamp 34 which is of the tungsten filament type, and also as indicated by the dotted lead lines, the battery 32 is connected by suitable circuitry to camera components for performance of its normal functions in connection with the operation of the camera, such as for example film winding. The lamp 34 is connectable in circuit with the battery 32 by means of a switch 36 which is normally in the open condition so that the battery checking apparatus of the present invention does not interfere with the normal operation of the camera.

The battery checking apparatus may be brought into operation by means of a push button assembly 40 which is slidably mounted in one sidewall of the camera casing 10. The push button assembly 40 includes a push button 41 which is external to the camera for manual operation. The push button assembly 40 is normally held in an outward or retracted position by the force of a spring 42 attached to a shield portion 44 of the push button assembly 40 and to a suitable position on the camera casing 10. A spring operating arm 46 on the shield portion 44 is adapted to be moved to contact the switch 36 upon operation of the push button assembly 40. While the push button assembly 40 is in its normal retracted position of FIG. 1, neither the shield portion 44 nor the operatng arm 46 perform any active function.

Figure 2:
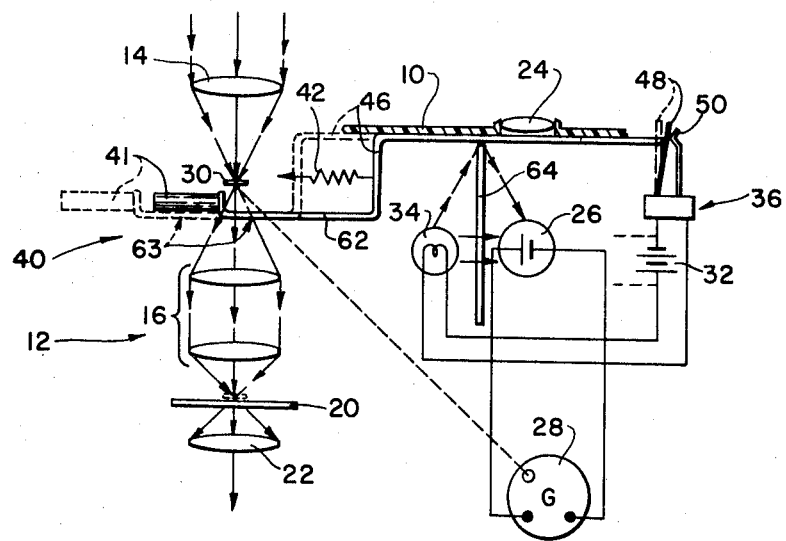
FIG. 2 is a plan view of the apparatus of FIG. 1 in an operative condition for checking a battery.

Reference is made to FIG. 2 in conjunction with FIG. 1 for a description of the operation of the apparatus when it is desired to check the condition of the battery 32. Finger pressure on the push button 41 moves the push button assembly 40 to an advanced position against the restoring action of the spring 42. In the advanced or extended position, the shield portion 44 is disposed between the lens 24 and the photovoltaic cell 26, and the passage of ambient light to impinge upon the photovoltaic cell 26 is interrupted. At the same time, the operating arm 46 is effective to cause engagement of a switch contact spring 48 with its opposing contact member 50 and thereby close the path through the tungsten lamp 34 and the battery 32. As shown by the arrows of FIG. 2, the photovoltaic cell 26 is now illuminated only by the light from the tungsten lamp 34, the luminosity of which varies with the voltage of the battery 32. The light incident onto the photovoltaic cell 26 creates a current flow between its terminals and thus a current flow in the galvanometer-photovoltaic cell circuit, causing a deflection of the galvanometer 28 by an amount dependent upon the current flowing. The deflection of the galvanometer 28 may be directly related to the power available condition of the battery 32. Since the galvanometer 28 is coupled to the signal vane 30, the deflection of the galvanometer 28 will cause a movement of the signal vane 30 relative to the light path of the view finder assembly 12. Lens component 16 images the signal vane 30 in the field mask 20 as shown by the dotted lines of FIG. 1. The image is erected by the eyepiece 22 as seen by the operator and occupies a position within the field mask 20 related to the deflection of the galvanometer 28; the deflection may be calibrated for battery 32 voltage and may be used as a visual indication of the condition of the battery.

After a battery check has been completed, finger pressure on the push button 41 is removed and the push button assembly 40 is returned to the normal retracted position by the force of the restoring spring 42. The photovoltaic cell 26 is again exposed to ambient light, and the deflection of the galvanometer 28 and the resulting position of the signal vane 30 relative to the view finder assembly 12 are functions of the intensity of the ambient light.

In the embodiment as described, the movement of the signal vane 30 relative to the aperture in the field mask 20 may be calibrated to provide a graduated indication of the battery voltage available and when properly calibrated is capable of detecting a voltage change in the order of 0.1 volts in a 3 volt battery. The indication provided may be provided by a scale, or by the movement of the signal vane 30 relative to the aperture of the field mask 20 or, as also shown in FIG. 1, at least one aperture 60 may be provided in the periphery of the field mask 20. Since the signal vane 30 is movable relative to the field mask 20, it may be used for blocking scene light through the aperture 60. Therefore, a second means is available for use as an indication of the level of the battery. When the aperture 60, or any number of apertures 60, is utilized as the indicator, the push button assembly 40 may include a portion designated generally as 62 on a slide arm 63, which is disposed, when the push button assembly 40 is in the normal retracted position, so that the lens component 16 images the portion 62 over the aperture 60 thereby blocking the aperture 60 from use during the normal retracted position of the push button assembly 40.

The operation of the apparatus may be enhanced by the use of facts known about a tungsten filament lamp. It is known that the luminosity of a tungsten filament lamp varies with the 3.7 power of applied voltage, which means that small voltage changes result in substantially large luminosity changes. In addition, a spectral shift in energy distribution in the radiated light results as the battery voltage decreases. When the battery voltage is high, the luminosity is principally in the blue range of the spectrum, and as the battery voltage decreases the luminosity approaches the red range. It is known that large power concentration is in the blue range as opposed to the red, therefore, by providing a blue filter 64 disposed between a tungsten lamp 34 and the photovoltaic cell 26, the luminosity in the blue range is enhanced and thus the effectiveness of the apparatus.

It will be apparent from the above description that there has been provided simple, effective and economically favorable battery checking means. Since the checking means utilizes the already existent ambient light metering means and the view finder assembly of the camera, it is obvious that provision of the battery checking means involves very small additional expense and no perplexing space providing problems. When in normal, nonchecking condition, the additional mechanism avoids entirely any interference with or modification of the normal camera operations.

The invention has been described in detail with particular reference to a preferred embodiment thereof, but it will be understood that variations and modifications can be effected within the spirit and scope of the invention.

I claim:

1. In a camera having means for receiving a battery, and ambient light measuring means including photosensitive means which when exposed to light has a parameter variable as the received light intensity varies, and a galvanometer operatively connected in circuit with said photosensitive means and responsive to variations in said parameter of said photosensitive means for providing an indication of light received by said photosensitive means, an improved battery checking means comprising:

means, connectable in circuit with a received battery, for radiating light of an intensity proportional to the power available in the received battery; and means for causing illumination of said photosensitive means to be substantially provided by the light from said radiating means so that said deflection of said galvanometer is indicative of the power of the received battery.

2. The invention defined in claim 1 wherein said light radiating means comprises a tungsten filament lamp.

3. The invention defined in claim 1 further comprising normally open contact means in the circuit of said radiating means and the received battery for connecting said radiating means to the received battery, and means for closing said contact means to cause energization of said light radiating means by the received battery, said closing means being located to prevent illumination of said photosensitive means by ambient light when said closing means closes said contact means.

4. The invention defined in claim 3 wherein said closing means includes a member mounted in the camera for movement between a first position spaced from said contact means and said photosensitive means, and a second position for closing said contact means and for blocking ambient light from impinging upon said photosensitive means.

5. The invention defined by claim 4 further including a filter which is sensitive to the blue spectral frequency range and means for positioning said filter in the light path between said lamp and said photosensitive element.

6. The invention defined by claim 5 further comprising semaphore means coupled to said galvanometer for indicating deflection of said galvanometer, and an optical viewfinder including an apertured field mask, said semaphore means being movable into, and out of, a viewable position in said aperture of said field mask.

7. The invention defined by claim 6 wherein said light blocking means includes a portion which is interposed in the light path between said semaphore means and said aperture in said field mask when said closing means is in said first position, said portion being removable from said light path when said closing means is in said second position.

* * * * *